US011941860B2

(12) United States Patent
Narendra

(10) Patent No.: US 11,941,860 B2
(45) Date of Patent: Mar. 26, 2024

(54) COMPUTATIONAL LOAD MITIGATION FOR IMAGE-BASED ITEM RECOGNITION

(71) Applicant: ZEBRA TECHNOLOGIES CORPORATION, Lincolnshire, IL (US)

(72) Inventor: Patrenahalli M. Narendra, Hoffman Estates, IL (US)

(73) Assignee: Zebra Tehcnologies Corporation, Lincolnshire, IL (US)

( * ) Notice: Subject to any disclaimer, the term of this patent is extended or adjusted under 35 U.S.C. 154(b) by 253 days.

(21) Appl. No.: 17/484,805

(22) Filed: Sep. 24, 2021

(65) Prior Publication Data

US 2023/0097019 A1     Mar. 30, 2023

(51) Int. Cl.
*G06V 10/25* (2022.01)
*G06F 3/14* (2006.01)
(Continued)

(52) U.S. Cl.
CPC ............. *G06V 10/25* (2022.01); *G06F 3/14* (2013.01); *G06F 18/22* (2023.01); *G06F 18/24* (2023.01); *G06K 7/1443* (2013.01); *G06T 7/70* (2017.01); *G06V 10/225* (2022.01); *G06V 20/20* (2022.01); *G06T 2207/30244* (2013.01); *G06V 2201/07* (2022.01)

(58) Field of Classification Search
CPC ...... G06V 10/25; G06V 10/225; G06V 20/20; G06V 2201/07; G06V 10/255; G06V 20/63; G06V 20/52; G06F 3/14; G06F 18/22; G06F 18/24; G06F 3/147; G06K 7/1443; G06T 7/70; G06T 2207/30244; G09G 2340/12

USPC ........................................................ 382/103
See application file for complete search history.

(56) References Cited

U.S. PATENT DOCUMENTS 9,179,278 B2 * 11/2015 Das ...................... G06F 16/487
10,579,869 B1 * 3/2020 Xiong .................. G06V 10/772
(Continued)

FOREIGN PATENT DOCUMENTS

CA      2815944 A1 *  5/2012 ........... G06F 16/433
CA      3057939 A1 *  4/2021
(Continued)

OTHER PUBLICATIONS

International Search Report and Written Opinion for International Application No. PCT/US2022/38193 dated Nov. 29, 2022.

*Primary Examiner* — Mahendra R Patel

(57) ABSTRACT

A method in a mobile computing device includes: controlling a camera to capture an image; tracking, in association with the image, a pose of the mobile computing device in a coordinate system; detecting a region of interest (ROI) depicting an item in the image; determining a location of the ROI in the coordinate system, based on the tracked pose; obtaining an item identifier corresponding to the ROI by (i) when a previously recognized item identifier is not available, executing a recognition mechanism to derive the item identifier from the ROI, and (ii) when a previously recognized item identifier is available, bypassing the recognition mechanism and retrieving the previously recognized item identifier; and returning the obtained item identifier corresponding to the ROI.

23 Claims, 7 Drawing Sheets

(51) Int. Cl.
*G06F 18/22* (2023.01)
*G06F 18/24* (2023.01)
*G06K 7/14* (2006.01)
*G06T 7/70* (2017.01)
*G06V 10/22* (2022.01)
*G06V 20/20* (2022.01)

(56) References Cited

U.S. PATENT DOCUMENTS

| | | | |
|---|---|---|---|
| 10,699,447 B2 * | 6/2020 | Dwivedi | G06T 9/00 |
| 11,256,914 B2 * | 2/2022 | Le Henaff | G06T 7/44 |
| 11,373,388 B2 * | 6/2022 | Simpson | G06K 7/1404 |
| 2014/0279294 A1 * | 9/2014 | Field-Darragh | G06Q 30/0282 |
| | | | 705/28 |
| 2014/0363048 A1 * | 12/2014 | Vrcelj | G06F 18/211 |
| | | | 382/103 |
| 2016/0125265 A1 * | 5/2016 | Xie | G06V 20/00 |
| | | | 382/209 |
| 2016/0321530 A1 * | 11/2016 | Troy | G06Q 10/02 |
| 2017/0337508 A1 * | 11/2017 | Bogolea | G06V 20/52 |
| 2018/0005035 A1 * | 1/2018 | Bogolea | B25J 11/008 |
| 2020/0090405 A1 * | 3/2020 | Lagmanson | G06T 19/006 |
| 2020/0111200 A1 * | 4/2020 | Li | G06N 3/08 |
| 2020/0298080 A1 * | 9/2020 | Zhang | G06N 3/045 |

FOREIGN PATENT DOCUMENTS

| | | | | |
|---|---|---|---|---|
| CA | 3001063 C | * | 9/2023 | A61B 5/00 |
| CA | 3115898 C | * | 9/2023 | G06K 9/00201 |
| WO | WO-2008150345 A1 | * | 12/2008 | A61B 3/113 |
| WO | WO-2021202518 A1 | * | 10/2021 | G06K 9/00288 |

* cited by examiner

COMPUTATIONAL LOAD MITIGATION FOR IMAGE-BASED ITEM RECOGNITION

BACKGROUND

Mobile computing devices such as smartphones, tablet computers and the like, may be employed in facilities such as warehouses and retail facilities to detect items (e.g. products on shelves) by capturing and processing images of portions of the facility. The number of items visible in a given image, however, coupled with the complexity of item recognition, may lead to incomplete processing of the image and missed item recognitions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
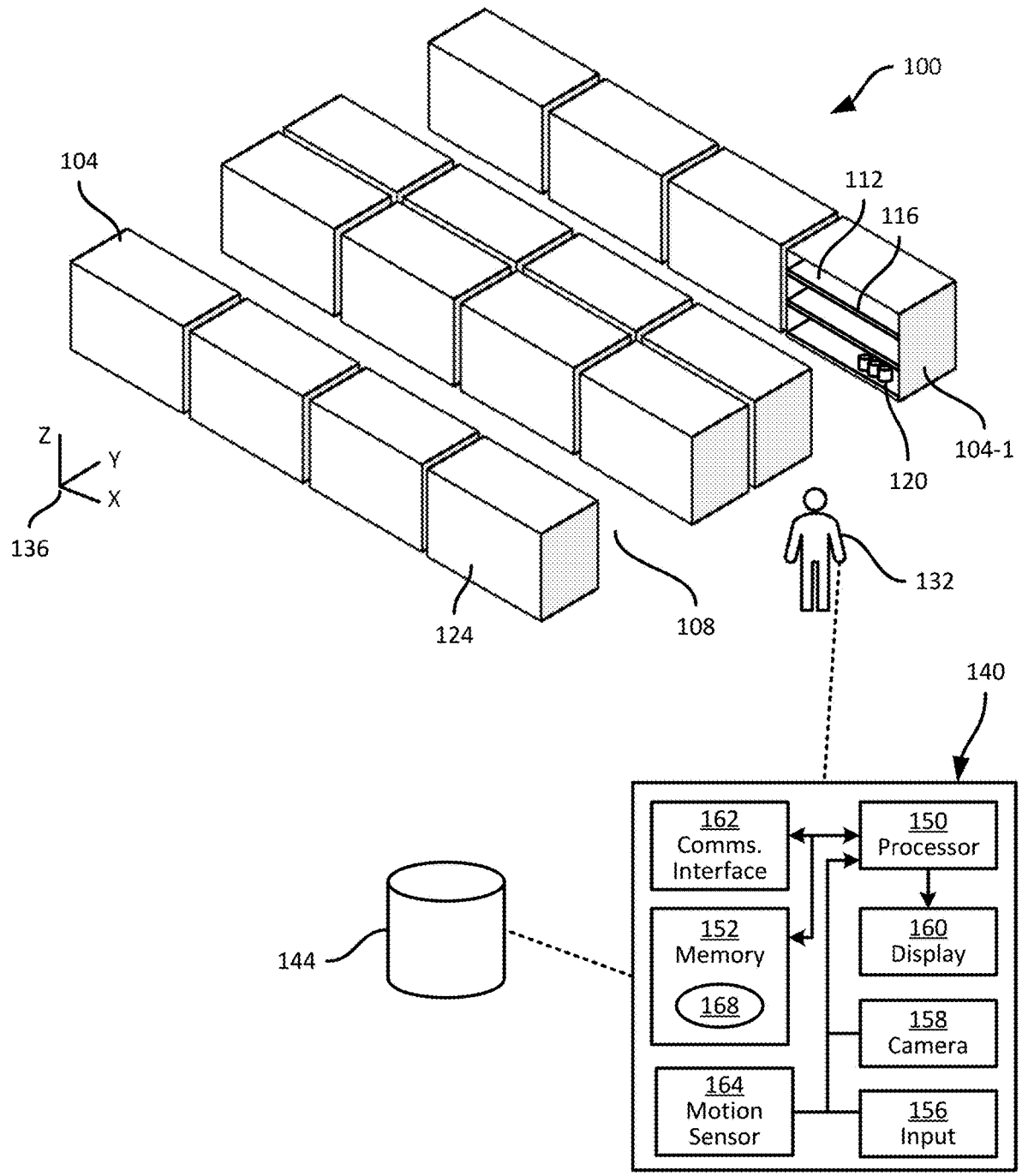
FIG. 1 is a diagram of a facility containing a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a mobile computing device, the method including: controlling a camera to capture an image; tracking, in association with the image, a pose of the mobile computing device in a coordinate system; detecting a region of interest (ROI) depicting an item in the image; determining a location of the ROI in the coordinate system, based on the tracked pose; obtaining an item identifier corresponding to the ROI by (i) when a previously recognized item identifier is not available, executing a recognition mechanism to derive the item identifier from the ROI, and (ii) when a previously recognized item identifier is available, bypassing the recognition mechanism and retrieving the previously recognized item identifier; and returning the obtained item identifier corresponding to the ROI.

Additional examples disclosed herein are directed to a computing device, comprising: a camera; a memory; and a processor configured to: control the camera to capture an image; track, in association with the image, a pose of the mobile computing device in a coordinate system; detect a region of interest (ROI) depicting an item in the image; determine a location of the ROI in the coordinate system, based on the tracked pose; to obtain an item identifier corresponding to the ROI, (i) when a previously recognized item identifier is not available, execute a recognition mechanism to derive the item identifier from the ROI, and (ii) when a previously recognized item identifier is available, bypass the recognition mechanism and retrieving the previously recognized item identifier; and return the obtained item identifier corresponding to the ROI.

Further examples disclosed herein are directed to a non-transitory computer-readable medium storing computer-readable instructions executable by a processor of a mobile computing device to: control a camera to capture an image; track, in association with the image, a pose of the mobile computing device in a coordinate system; detect a region of interest (ROI) depicting an item in the image; determine a location of the ROI in the coordinate system, based on the tracked pose; to obtain an item identifier corresponding to the ROI, (i) when a previously recognized item identifier is not available, execute a recognition mechanism to derive the item identifier from the ROI, and (ii) when a previously recognized item identifier is available, bypass the recognition mechanism and retrieving the previously recognized item identifier; and return the obtained item identifier corresponding to the ROI.

FIG. 1 illustrates an interior of a facility, such as a retail facility (e.g. a grocer). In other examples, the facility 100 can be a warehouse, a healthcare facility, a manufacturing facility, or the like. The facility 100 includes a plurality of support structures carrying items. In the illustrated example, the support structures include shelf modules 104, e.g. arranged in sets forming aisles 108. FIG. 1, specifically, illustrates two aisles 108 each formed by eight modules 104. The facility 100 can have a wide variety of layouts other than the example layout shown in FIG. 1.

The modules 104 include support surfaces, such as shelves, pegboards, and the like, to support items thereon. Certain components of one example module 104-1 in FIG. 1 are illustrated, including support surfaces 112 (three support surfaces 112, in the illustrated example) terminating in shelf edges 116, which face into the corresponding aisle. A shelf edge 116, as will be apparent to those skilled in the art, is a surface bounded by adjacent surfaces having different angles of inclination. In the example illustrated in FIG. 1, each shelf edge 116 is at an angle of about ninety degrees relative to the corresponding support surface 112 above that shelf edge 116 and the underside (not shown) of the support surface 112. In other examples, the angles between a shelf edge 116 and adjacent surfaces is more or less than ninety degrees.

The support surfaces 112 carry items such as products 120 thereon, for retrieval by customers, workers and the like in the facility. As seen in FIG. 1, the support surfaces 112 are accessible from the aisle 108 into which the shelf edges 116 face. In some examples, each module 104 has a back wall 124 rendering the support surfaces 112 inaccessible from the opposite side of the module 104. In other examples, however, the module 104 can be open from both sides (e.g. the back wall 124 can be omitted).

As will be apparent, the facility 100 may contain a wide variety of products 120 disposed on the modules 104. The facility 100 may be sufficiently large, and/or contain a sufficient number of different types of products 120, to complicate navigation of the facility 100 by a worker 132, a customer or the like, e.g. to locate one or more particular products 120 or perform other tasks. Examples of such other tasks may include retrieving (also referred to as picking) items for order fulfillment, checking compliance of the products 120 with a planogram specifying the expected location of the products 120, and the like.

To assist in the above tasks, the worker 132 is equipped with a mobile computing device 140, also referred to simply as a device 140. The device 140 can be a tablet computer, a smart phone, a wearable computer (e.g. smart glasses), or the like. The device 140 can be configured to capture images of the shelf modules 104, and to detect and recognize items thereon, including the products 120, labels on the shelf edges, barcodes or other machine-readable indicia on such labels, shelf horizontal and vertical structures, and the like. Recognition can therefore include decoding product identifiers from barcodes, deriving product classifications from images of the products 120 themselves, and the like.

The output of item recognition mechanisms executed by the device 140 can be used to provide directional and/or task guidance to the worker 132, e.g. via augmented reality overlays on a display of the device 140. The output of the item recognition mechanisms can also be employed to verify planogram compliance as noted earlier, and/or to construct a realogram of the facility. Planogram and/or realogram data can be maintained in a repository 144 stored at the device 140, or stored at another computing device that is accessible to the device 140 via a network deployed in the facility 100, e.g. a server connected to the network.

A given image captured by the device 140 may be processed and depict multiple items 120, labels, barcodes, or the like. Further, in some use cases, e.g. the directional or task guidance mentioned above, as well as the compliance verification and/or repository updating mentioned above, the device 140 may operate in a video mode, in which new images are captured in a sequence, e.g. at a rate of about 30 images per second. In other words, each image may be captured about 30 ms before the next. However, item recognition mechanisms like barcode decoding, product classification, and the like, may be sufficiently computationally intensive that when an image depicts a number of distinct items, the inter-frame period (e.g. about 30 ms) is insufficient to complete the recognition of each item in the image. As a result, the device 140 may provide incomplete or erroneous output for the task at hand.

The device 140 is therefore further configured, as will be discussed in detail below, to employ pose tracking and historical data in order to bypass the execution of certain computationally intensive item recognition mechanisms. That is, the device 140 can mitigate the computational load involved in item recognition by tracking its pose (i.e. location and orientation) in the facility, e.g. relative to a facility coordinate system 136. The tracked pose of the device 140 can be combined with previously recognized item identifiers from the repository 144, to correlate regions of interest in an image with locations for which an item identifier has already been recognized (e.g. from an earlier image).

FIG. 1 also illustrates certain internal components of the device 140. The device 140 includes a special-purpose controller, such as a processor 150, interconnected with a non-transitory computer readable storage medium, such as a memory 152. The memory 152 includes a combination of volatile memory (e.g. Random Access Memory or RAM) and non-volatile memory (e.g. read only memory or ROM, Electrically Erasable Programmable Read Only Memory or EEPROM, flash memory). The processor 150 and the memory 152 each comprise one or more integrated circuits.

The device 140 also includes at least one input device 156 interconnected with the processor 150. The input device 156 is configured to receive input and provide data representative of the received input to the processor 150. The input device 156 includes any one of, or a suitable combination of, a touch screen, a keypad, a trigger button, a microphone, and the like. In addition, the device 140 includes a camera 158 including a suitable image sensor or combination of image sensors. The camera 158 is configured to capture images (e.g. single frames or video streams including sequences of image frames) for provision to the processor 150.

The device 140 also includes a display 160 (e.g. a flat-panel display integrated with the above-mentioned touch screen) interconnected with the processor 150, and configured to render data under the control of the processor 150. The client device 105 can also include one or more output devices in addition to the display 160, such as a speaker, a notification LED, and the like (not shown).

The device 140 also includes a communications interface 162 interconnected with the processor 150. The communications interface 162 includes any suitable hardware (e.g. transmitters, receivers, network interface controllers and the like) allowing the client device 105 to communicate with other computing devices via wired and/or wireless links (e.g. over local or wide-area networks). The specific components of the communications interface 162 are selected based on the type(s) of network(s) or other links that the device 140 is required to communicate over.

Further, the device 140 includes a motion sensor 164, such as an inertial measurement unit (IMU) including one or more accelerometers, one or more gyroscopes, and/or one or more magnetometers. The motion sensor 164 is configured to generate data indicating detected movement of the device 140 and provide the data to the processor 150, for example to enable the processor 150 to perform the pose tracking mentioned earlier.

The memory 152 stores computer readable instructions for execution by the processor 150. In particular, the memory 152 stores an item recognition application 168 (also referred to simply as the application 168) which, when executed by the processor 150, configures the processor 150 to perform various functions discussed below in greater detail and related to the determination of device pose in the facility coordinate system 136. The application 168 may also be implemented as a suite of distinct applications in other examples.

The processor 150, when so configured by the execution of the application 168, may also be referred to as an imaging controller 150. Those skilled in the art will appreciate that the functionality implemented by the processor 150 via the execution of the application 168 may also be implemented by one or more specially designed hardware and firmware components, such as FPGAs, ASICs and the like in other embodiments.

Figure 2:
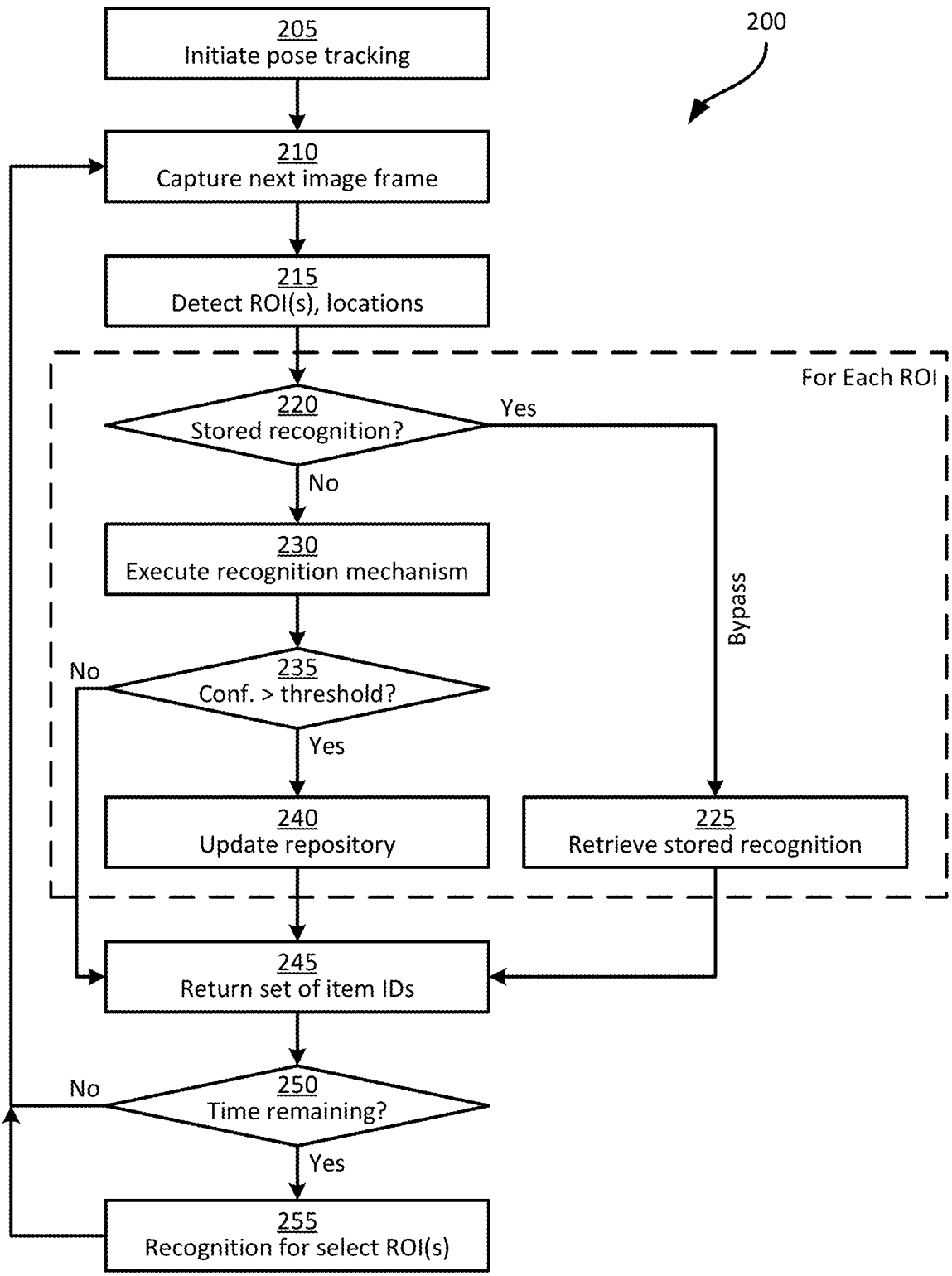
FIG. 2 is a flowchart of a method of image-based item recognition.

Turning to FIG. 2, a method 200 of image-based item recognition is shown. The method 200 will be discussed below in conjunction with its performance by the device 140. As will be apparent, multiple devices 140 may be deployed in the facility 100, and each device 140 can perform a separate instance of the method 200. In other examples, a computing device such as a server deployed in the facility, e.g. the server mentioned above as storing the repository 144, can perform the method 200 on behalf of the device 140. That is, the server can perform separate instances of the method 200 for each device 140 in the facility.

At block 205, the device 140 is configured to initiate pose tracking. Initiation of pose tracking at block 205 occurs in response to execution of the application 168, e.g. in response to an input from the operator of the device 140, a command from another computing device, or the like. Pose tracking can involve initiation of a local coordinate system, created by the device 140 arbitrarily (e.g. without a predetermined relationship to the facility coordinate system 136). The local coordinate system can then be registered to the facility coordinate system 136 according to various mechanisms, such as the imaging of predetermined anchor features in the facility, and/or the detection of wireless signals from beacons, access points and the like with predetermined locations in the facility. In the discussion below, it is assumed that the pose of the device 140 is tracked in the facility coordinate system 136. However, the method 200 can also be performed in the absence of registration between the facility coordinate system 136 and the above-mentioned local coordinate system.

Pose tracking involves capturing a sequence of images using the camera 158 and tracking the positions of features (e.g. surfaces, edges, corners, and the like) in the sequence. The positions of such features throughout the sequence of images, combined with data from the motion sensor 164, are used to track movement of the device 140, e.g. in six degrees of freedom. More specifically, the device 140 is configured to generate a sequence of poses of the device 140 in the local coordinate system, which are then transformed into the facility coordinate system 136.

Various mechanisms will occur to those skilled in the art to combine image and/or motion sensor data to generate pose estimations. Examples of such mechanisms include those implemented by the ARCore software development kit provided by Google LLC, and the ARKit software development kit provided by Apple Inc. Pose tracking, once initiated at block 205, continues throughout the remainder of the method 200. The frequency with which new pose estimates are generated by the device 140 varies, for example with the computational resources available to the device 140, the frame rate of the camera 158, and the like. For example, the device 140 may generate pose estimates at a frequency of about 30 Hz, although higher and lower frequencies are also contemplated.

At block 210, the device 140 is configured to capture an image, e.g. as part of a sequence of images. In the present example, the device 140 initiates the capture of a sequence of images at block 205 for use in pose tracking. Therefore, at block 210, no additional image capture is necessary. In other examples, pose tracking may be performed without images, in which case the device 140 is configured to control the camera 158 to begin capturing images at block 210. Although a single image can be captured and processed via the method 200, the performance of the method 200 is discussed below in the context of the capture of a sequence of images, and the processing of each image in the sequence via repetitions of the method 200.

At block 215, the device 140 is configured to detect a set of regions of interest (ROIs) in the image captured at block 210, and to determine the locations of the ROIs in the same coordinate system as used for pose tracking at block 205.

The ROIs detected at block 215 are regions of the image that are likely to contain items that the performance of the method 200 is intended to detect and recognize. The items can include machine-readable indicia such as barcodes, e.g. presented on labels on the shelf edges 116. The items can also include the products 120 themselves, in some examples. In the example performance of the method 200 discussed below, the items are barcodes, and the detection at block 215 therefore includes detecting image features indicative of the presence of a barcode. Examples of such features include substantially horizontal and/or vertical edges, regions of the image with vertical gradients (e.g. resulting from the vertical lines of a one-dimensional barcode), and the like. Of note, the detection of ROIs at block 215 does not result in the recognition of items, e.g. the decoding of barcodes. Rather, the detection of ROIs merely identifies portions of the image that may contain items of interest. Further processing is performed on the ROIs in order to recognize items therein. The detection of ROIs in the image can also be accomplished by executing a machine learning-based process, e.g. based on the You Only Look Once (YOLO) algorithm. Such a process can be trained prior to performance of the method 200 based on a labeled set of images containing barcodes or other items.

Figure 3:
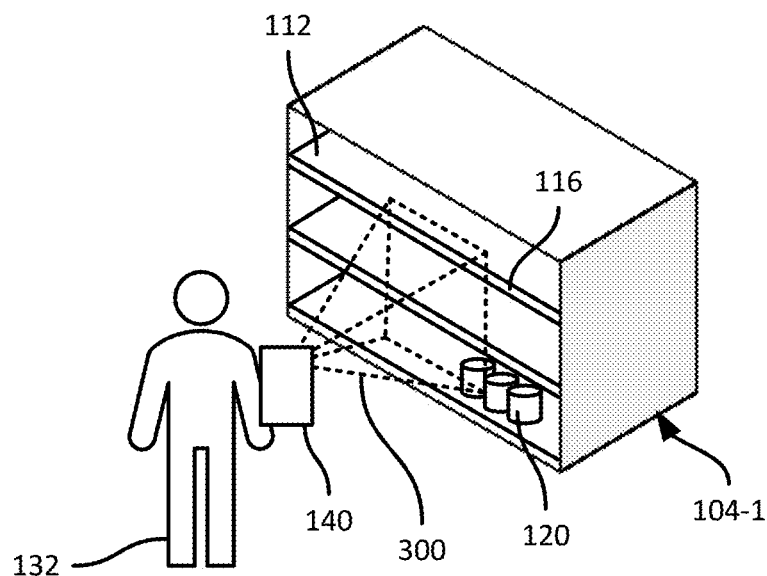
FIG. 3 is a diagram illustrating an example performance of blocks 210 and 215 of the method of FIG. 2.
Figure 3:
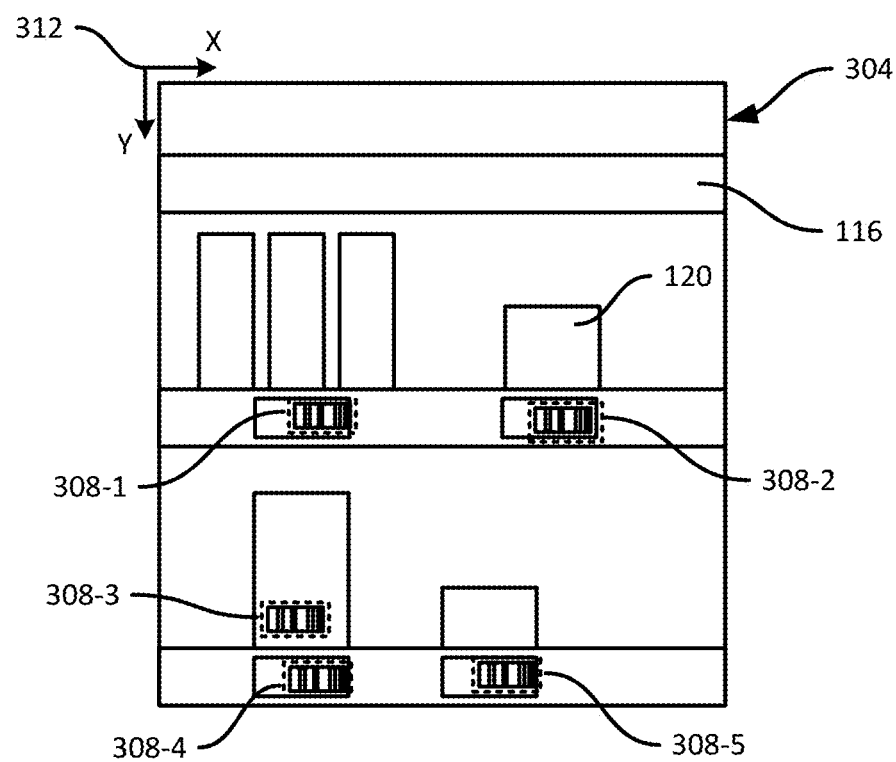

Turning to FIG. 3, an example performance of blocks 210 and 215 is illustrated. In particular, the device 140 is shown being held by the worker 132 to direct a field of view (FOV) 300 of the camera 158 towards the shelf module 104-1. The device 140 therefore captures an image 304 of the module 104-1, depicting various products 120, portions of the shelf edges 116, and the like.

The device 140 detects, at block 215, a set of regions of interest 308 likely to contain barcodes (e.g. as indicated by vertical gradients or other features detected in the image 304, or as indicated in the output of a machine learning-based mechanism as mentioned above). In particular, five ROIs 308-1, 308-2, 308-3, 308-4, and 308-5 are shown as having been detected in FIG. 3. As will be apparent, various other numbers of ROIs can also be detected in the image 304, depending on the number of barcodes present in the image 304. Each detected ROI 308 can be detected as a bounding box in a two-dimensional image coordinate system 312. For example, each ROI 308 can be defined by four pairs of coordinates, each corresponding to a respective corner of the ROI 308.

Figure 4:
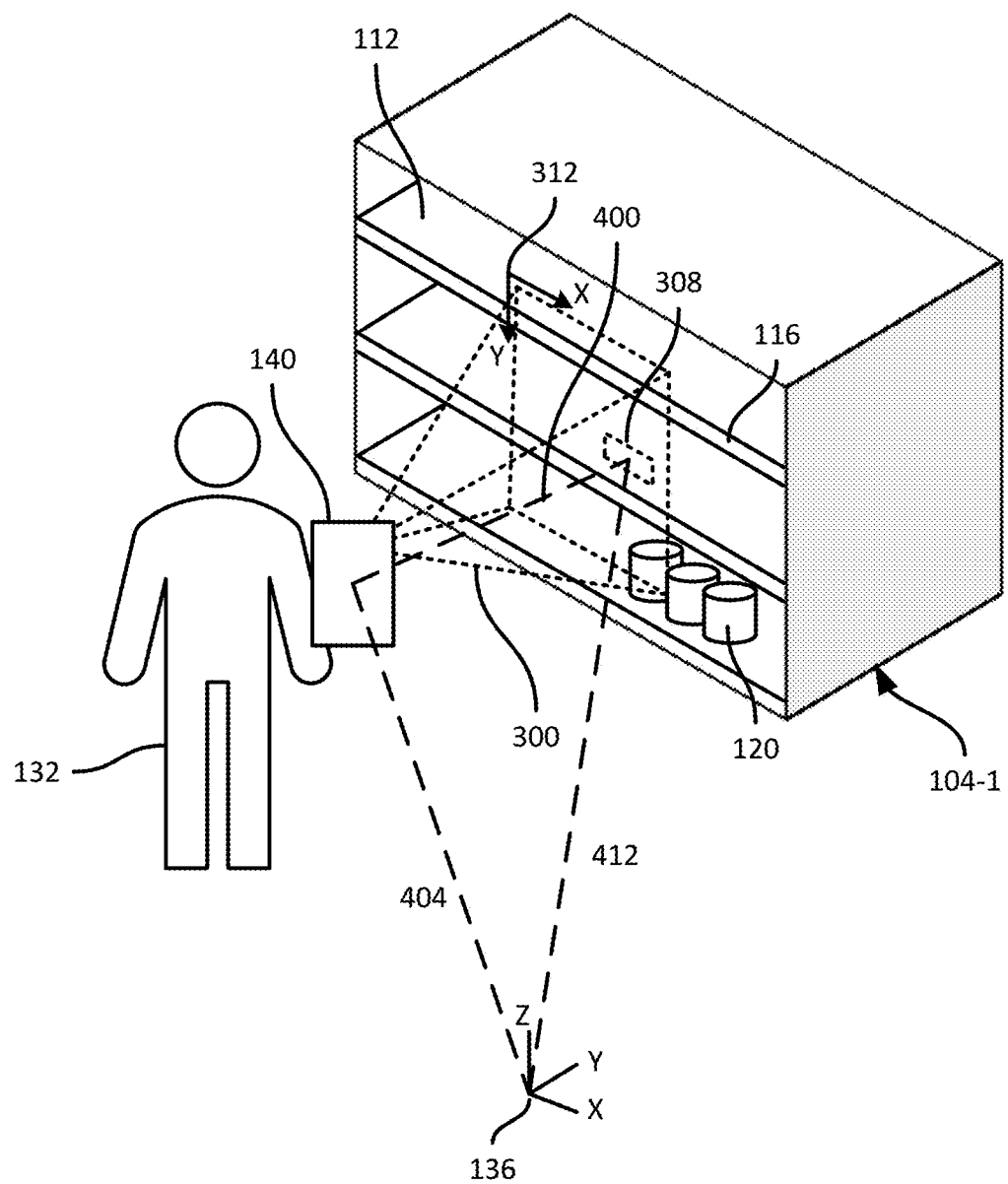
FIG. 4 is a diagram illustrating the determination of locations for regions of interest at block 215 of the method of FIG. 2.

As noted above, the device 140 is also configured to determine the locations of the ROIs 308 in the same coordinate system as is employed for pose tracking of the device 140. In the present example, therefore, the location of each ROI 308 is determined in the facility coordinate system 136 at block 215. Referring to FIG. 4, to convert the image coordinates of an ROI 308 (i.e. defined in the image coordinate system 312) to coordinates in the facility coordinate system 136, the device 140 can be configured to determine a location 400 of the ROI 308 relative to the device 140 itself. Determination of the location 400 can be performed using camera calibration data stored at the device 140, which specifies the position of the camera 158 relative to the device housing, as well as focal length and other relevant camera parameters. Using the location 400, and the pose 404 of the device 140 in the facility coordinate system 136, the device 140 can therefore determine a location 412 of the ROI 308 in the coordinate system 136. For example, the location of the ROI 308 in the facility coordinate system 136 can include sets of three-dimensional coordinates for each corner of the ROI 308. In other examples, the location of the ROI 308 in the facility coordinate system 136 can include a single coordinate, e.g. corresponding to a centroid of the ROI 308, in some examples combined with a normal vector indicating the orientation of the ROI 308. There may be a delay (of several frame periods in some examples, or about 100 ms, although shorter and longer delays are also contemplated) between the time the image is captured at block 210, and the time at which block 215 is performed. The poses captured via block 205, as well as the images captured at block 210, are therefore timestamped, and when processing an image at block 215, the device 140 can therefore retrieve a pose having a matching timestamp (representing the contemporaneous pose of the device 140 at the time the image under processing was captured).

Returning to FIG. 2, having captured the image 304, and detected and located each of the ROIs 308, the device 140 is configured to perform a set of actions, bounded in FIG. 2 by a dashed box, for each of the ROIs 308. More specifically, the device 140 can be configured to repeat the actions shown in the dashed box in FIG. 2 until either every ROI 308 has been processed, or until the next image is captured at block 210. As will be apparent, in examples in which images are being captured in sequence (e.g. in a video stream), the next image may be captured automatically, e.g. about 30 ms after the previous image. In such implementations, any ROIs 308 that have not been processed by the time the next image 304 is captured are simply discarded. As will be apparent in the discussion below, by mitigating the computational load associated with processing the ROIs 308, the device 140 reduces the likelihood of ROIs 308 being discarded before processing.

In general, processing of the ROIs 308 serves to derive item identifiers from the ROIs 308. In the case of ROIs 308 likely to contain barcodes, the item identifiers are alphanumeric strings that may represent universal product codes (UPCs) or the like corresponding to particular products 120. Derivation of the item identifiers therefore includes selection of a symbology that corresponds to a barcode in the ROI 308, e.g. from a number of symbologies the device 140 is configured to decode, and processing of the image data in the ROI 308 according to the selected symbology to decode the barcode and thereby obtain the item identifier.

As will be apparent, in other examples where the ROIs 308 contain items other than barcodes, e.g. products 120, the processing of ROIs 308 to obtain item identifiers can include applying machine learning techniques to classify the image data in each ROI 308. Classification can determined a class of product shown in the ROI 308 (e.g. cereal), a specific type of product (e.g. a particular brand of cereal), or the like.

While detecting the ROIs 308 and determining locations for the ROIs 308 at block 215 is computationally relatively simple, deriving item identifiers from the ROIs 308 as summarized above can be more computationally demanding. The set of functions implemented by the device 140 in the dashed box of FIG. 2 therefore enables the device 140 to bypass the computation involved in deriving an item identifier from an ROI 308, by relying on the pose from block 205, the location from block 215, and the historical data, e.g. from the repository 144.

At block 220, the device 140 is configured to determine whether a previously recognized item identifier is available for the location 412 of the ROI 308 (i.e. the location in the facility coordinate system 136, which can be compared to different ROIs 308 across different image captures and at different times). Determining whether a previously recognized item identifier is available includes querying the repository 144 using the location 412.

The repository 144 can include, for at least a subset of the items in the facility 100 (e.g. at least a subset of barcodes, in the present example), respective locations in the facility coordinate system 136, as well as corresponding item identifiers. The item identifiers in the repository 144 are referred to as previously recognized identifiers, as they can be stored in the repository 144 as a result of previous performances of the method 200. In some examples, however, the previously recognized item identifiers may also be input into the repository 144 manually, e.g. during the creation of a planogram in the facility 100.

To perform block 220, the device 140 is configured to query the repository 144 (locally if the repository 144 is stored in the memory 152, or by sending a request to another computing device if the repository 144 is hosted outside the device 140). The query can include, for example, a request for any item identifiers stored in the repository within the boundaries of the image 304 as defined in the facility coordinate system 136. In response to the request, the device 140 may therefore receive item identifiers and corresponding locations. The device 140 can compare the received locations with the locations of the ROIs to determine whether any ROIs match any item identifiers.

The repository can include locations for item identifiers in the form of coordinates for corners, as noted above in connection with the ROIs. In other examples, the locations in the repository 144 can include a single set of coordinates for each item identifier, e.g. representing a centroid of the corresponding item. The device 140 may therefore be configured to assess the similarity between locations from the repository 144 and the ROIs 308 in various ways, depending on the nature of the locations received from the repository 144. For example, the device 140 can compute a centroid for each ROI, and determine a distance between that centroid and the location received for a given item identifier from the repository 144. When the distance is below a threshold, the received item identifier is assumed to correspond to the same item as the ROI 308, and the determination at block 220 is affirmative. In other examples, when regions are specified for each item identifier in the repository 144 (e.g. by coordinates defining sets of corners), a degree of overlap between the received item identifier location and the ROI can be compared to a threshold. The determination at block 220 is affirmative if the overlap exceeds a threshold (e.g. 80% of the area of the ROI 308 overlapping with the area of the item identifier location from the repository 144).

In further examples, the device 140 can query the repository 144 separately for each ROI 308. For example, the device 140 can query the repository 144 for any item identifiers within a threshold distance (as assessed above) of a particular ROI 308. Further queries can be generated for the remaining ROIs 308.

When the determination at block 220 is affirmative, the device 140 proceeds to block 225, bypassing the item recognition computation discussed below. At block 225, instead of performing the computationally demanding task of deriving an item identifier from the ROI 308, the device 140 need only retrieve the item identifier corresponding to the matching location from block 220.

Figure 5:
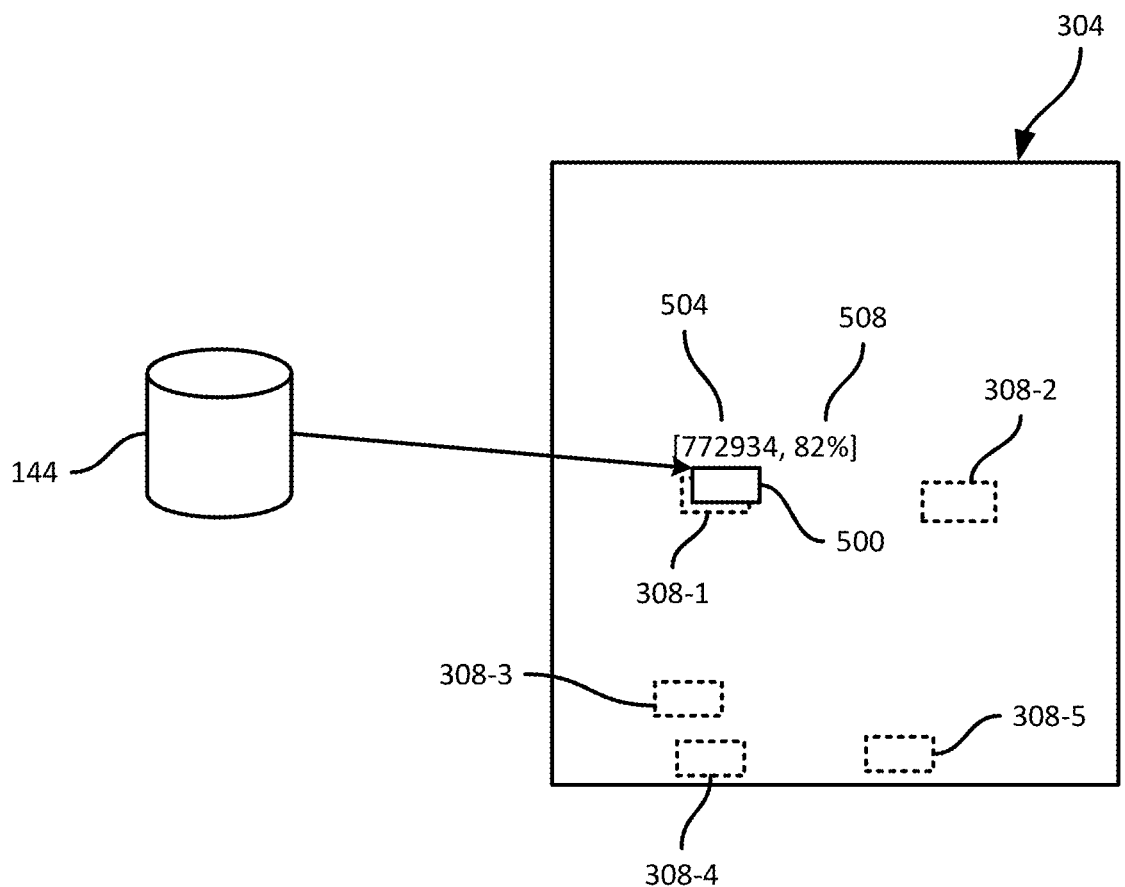
FIG. 5 is a diagram illustrating an example performance of block 220 of the method of FIG. 2.

Turning to FIG. 5, the boundary of the image 304 is shown, along with the locations of the ROIs 308. Also illustrated in FIG. 5 is the location (in the facility coordinate system 136) of a previously recognized item identifier 500 in the repository 144. The previously recognized item identifier 500 as stored in the repository 144 includes a location indicated by the solid bounding box, as well as an item identifier 504 (e.g. a product identifier encoded in a barcode)

and a confidence level 508. The confidence level indicates a confidence associated with the recognition of the item identifier 504 when the item identifier 504 was previously recognized (e.g. in an earlier performance of the method 200). Although the confidence level 508 is illustrated as a percentage, other forms of confidence level are also contemplated. In some examples, a second confidence level can be stored in connection with the previously recognized item identifier 500. The second confidence level represents the confidence associated with the tracked pose generated at block 205 when the previously recognized item identifier 500 was detected and recognized (in a previous performance of the method 200). In further examples, the two confidence levels mentioned above can be combined to produce an aggregate confidence level, which is then stored in the repository 144.

As will be apparent from FIG. 5, the determination at block 220 for the ROI 308-1 is affirmative, while the determinations at block 220 for each of the ROIs 308-2 to 308-5 are negative, as the repository 144 does not contain previously recognized item identifiers with locations matching those of the ROIs 308-2 to 308-5.

Referring again to FIG. 2, when the determination at block 220 is negative, at block 230 the device 140 is configured to execute an item recognition mechanism to derive an item identifier from the image data in the ROI 308. For example, in the case of ROIs containing barcodes, the device 140 is configured to execute a decoder function to detect a symbology corresponding to the barcode, and to extract data encoded in the barcode. In the case of ROIs containing products or other objects, the device 140 is configured to execute a classifier, e.g. a neural network or other suitable machine-learning-based process trained to distinguish between classes of products, specific product types, or the like. In further examples, the item recognition mechanism executed at block 230 can include an optical character recognition (OCR) process, e.g. to derive alphanumeric strings from a label or the like within the ROI 308.

At block 235, the device 140 is configured to determine whether a confidence level associated with the recognition mechanism executed at block 230 exceeds a threshold. As noted above, the item recognition mechanism produces as output both an item identifier (e.g. a decoded string, in the case of an ROI 308 containing a barcode) and a confidence level. When the confidence level is sufficiently high, at block 240 the derived item identifier can be written to the repository, for use in processing subsequent images at the device 140, or in processing images captured by other mobile devices that also have access to the repository 144.

In some examples, both an item recognition confidence level and a localization confidence level arising from the performance of block 205 can be evaluated at block 235. Specifically, a pose tracking confidence level corresponding to the pose of the device 140 at the time the current image was captured at block 210 can be compared to a threshold. If both the localization confidence and the recognition confidence exceed respective thresholds, the determination at block 235 is affirmative. In other examples, the device 140 can generate an aggregate confidence level from the above-mentioned levels, and compare the aggregate confidence level to a single threshold at block 235.

When the determination at block 235 is negative, the device 140 omits block 240, and proceeds directly to block 245. As shown in FIG. 2, the device also proceeds to block 245 from block 225, for ROIs 308 for which item recognition was bypassed.

Figure 6:
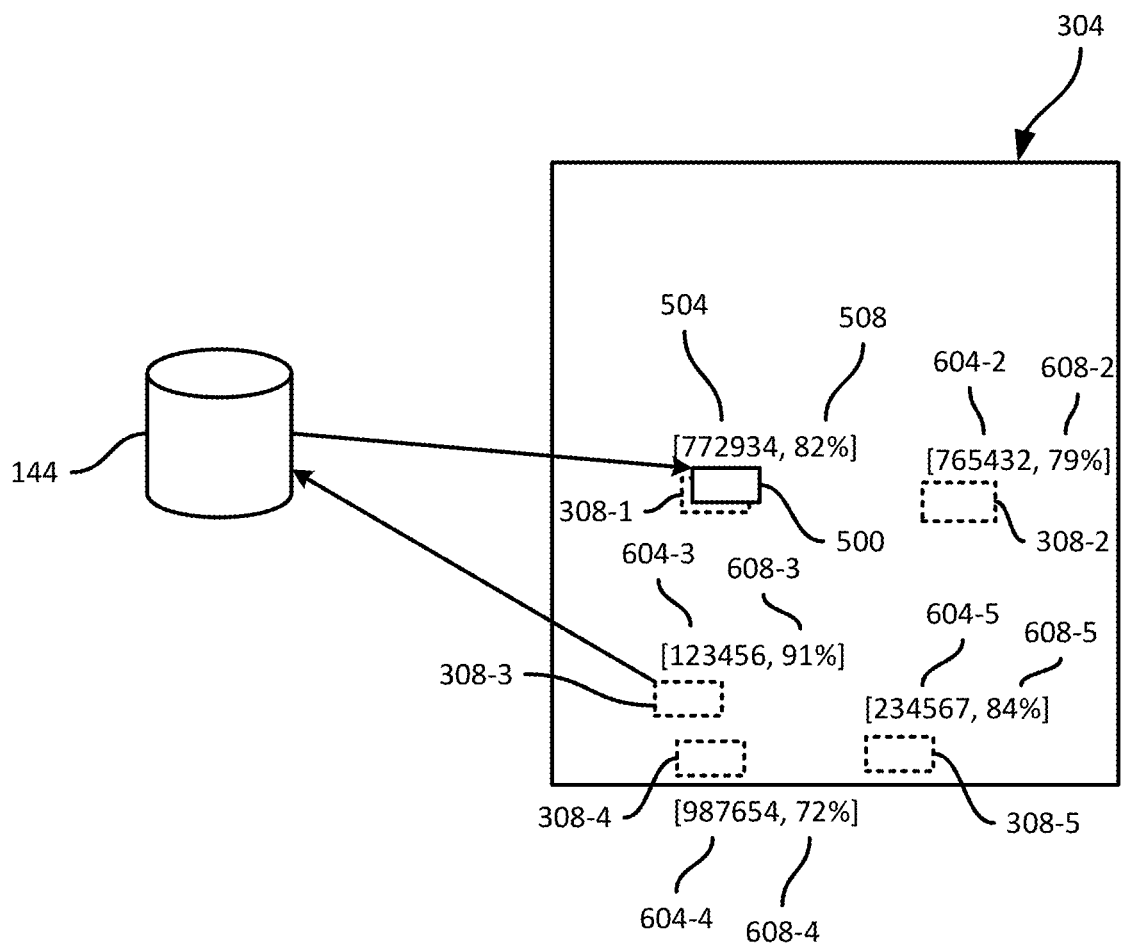
FIG. 6 is a diagram illustrating example output from the performance of blocks 220-240 of the method of FIG. 2.

FIG. 6 illustrates example performances of blocks 220-240 for each of the ROIs 308. In particular, as noted above, the ROI 308-1 yields an affirmative determination at block 220, and the execution of the item recognition mechanism is bypassed. For the ROIs 308-2 to 308-5, respective item identifiers 604-2, 604-3, 604-4, and 604-5 are derived at corresponding performances of block 230, along with respective confidence levels 608-2, 608-3, 608-4, and 608-5. Assuming that the threshold applied at block 235 is 85% in this example, the determination at block 235 is negative for the ROIs 308-2, 308-4, and 308-5, and affirmative for the ROI 308-3. The item identifier 604-3 and the confidence level 608-3 (as well as the location of the ROI 308-3) are therefore written to the repository 144 at block 240 as discussed above.

Returning to FIG. 2, at block 245, once all ROIs 308 in the image 304 have been processed, the device 140 returns the set of item identifiers obtained via blocks 220-240. The set of item identifiers may, for example, be provided to another application being executed by the processor 150, such as a directional guidance application, a planogram compliance application, or the like. Therefore, at block 245, the processor 150 can also control an output of the device 140, such as the display 160, to present one or more of the item identifiers obtained via blocks 220-240. In some examples, the display can present each of the item identifiers, e.g. as an overlay on the image from block 210. In other examples, the device 40 can control the display 160 to highlight the location of a specific one of the item identifiers on the image, e.g. to provide directional guidance to the worker 132.

Figure 7:
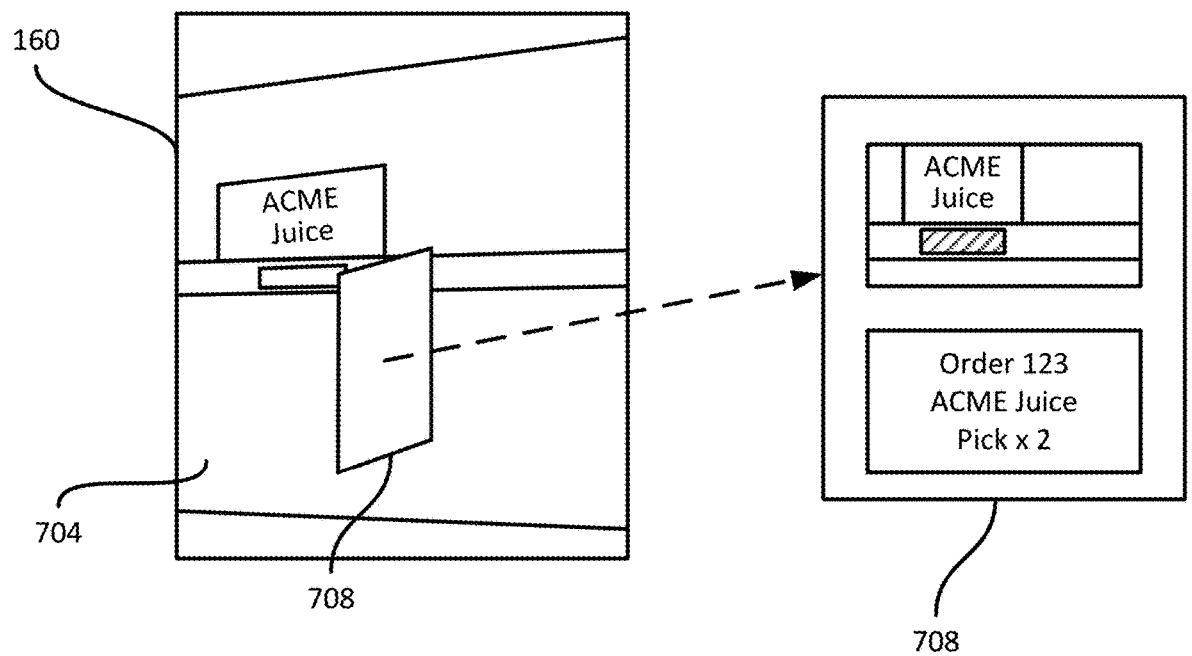
FIG. 7 is a diagram illustrating overlay data presented by the device of FIG. 1.

Turning to FIG. 7, an example output generated at block 245 is illustrated. In particular, FIG. 7 illustrates the display 160, presenting a portion of an image 704 captured by the camera 158 at block 210. The display 160 also presents a virtual object overlay 708, e.g. rendered as a sign extending out from the module 104 into the aisle. The virtual object overlay 708 contains task data, e.g. instructing the worker 132 to collect two of a given product 120, e.g. to fulfill an online shopping order. The position of the overlay 708 relative to the image 704 can be selected by matching task information (e.g. a target item identifier) with the corresponding item identifier from the ROIs 308. Various other forms of output can also be generated by the device 140, including notifications presented on the display or transmitted to other computing devices, and the like.

Returning to FIG. 2, in some examples the device 140 can return to block 210 following the performance of block 245. In other examples, as illustrated, the device 140 can proceed to block 250. At block 250 the device 140 can determine whether any time remains before the next image is captured at block 210 (e.g. whether the amount of time until the next capture exceeds a threshold, e.g. 5 ms). When the determination at block 250 is negative, the device 140 returns to block 210. However, when the determination at block 250 is affirmative, the device 140 proceeds to block 255.

At block 255, the device 140 is configured to execute the recognition mechanism from block 230 for at least one of the ROIs 308 for which item recognition was previously bypassed. In effect, at block 255 the device 140 is configured to perform blocks 230, 235 and 240 for one or more ROIs for which previously recognized item identifiers are available. When computational resources are available, as indicated by the affirmative determination at block 250, the device 140 can select one or more ROIs 308 for which item recognition was previously bypassed. The selection can be based on the stored confidence level associated with the corresponding previously recognized item identifiers, e.g. such that the previously recognized item identifier with the lowest confidence is selected first for processing, or such that the previously recognized item identifier with the greatest age is selected first for processing. The execution of item recognition for such ROIs 308 may lead to results with improved confidence levels compared to those stored in the repository 144.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a mobile computing device, the method comprising:
   controlling a camera to capture an image;
   tracking, in association with the image, a pose of the mobile computing device in a coordinate system;
   detecting a region of interest (ROIs) depicting an item in the image;
   determining a location of the ROI in the coordinate system, based on the tracked pose;
   obtaining an item identifier corresponding to the ROI by (i) when a previously recognized item identifier is not available, executing a recognition mechanism to derive the item identifier from the ROI, and (ii) when the previously recognized item identifier is available, bypassing the recognition mechanism and retrieving the previously recognized item identifier; and
   returning the obtained item identifier corresponding to the ROI.

2. The method of claim 1, further comprising: controlling a display of the mobile computing device to present a notification based on the obtained item identifier.

3. The method of claim 2, wherein the detecting includes detecting a set of ROIs depicting respective items in the image, the method further comprising:
repeating the determining a location and obtaining an item identifier for each ROI;
maintaining a target item identifier; and
selecting one of the ROIs corresponding to an obtained item identifier matching the target item identifier; and
wherein controlling the display includes presenting the image and a highlight of the one of the ROIs.

4. The method of claim 1, wherein the item includes a barcode, and wherein the item identifier includes a string decoded from the barcode.

5. The method of claim 1, wherein the item includes a product, and wherein the item identifier includes a product classification corresponding to the product.

6. The method of claim 1, wherein the recognition mechanism includes at least one of a barcode decoding mechanism, an optical character recognition (OCR) mechanism, and an object classification mechanism.

7. The method of claim 1, further comprising:
determining whether the previously recognized item identifier is available by accessing a repository of previously recognized item identifiers.

8. The method of claim 7, further comprising:
in response to executing the recognition mechanism to derive the item identifier, updating the repository to store the derived item identifier as the previously recognized item identifier.

9. The method of claim 8, further comprising:
prior to updating the repository, determining that a confidence level associated with the derived item identifier meets a threshold.

10. The method of claim 9, wherein the confidence level includes at least one of (i) a localization confidence level associated with the pose of the mobile computing device, and (ii) a recognition confidence level associated with the recognition mechanism.

11. The method of claim 7, further comprising:
determining whether a time period remaining before the capture of a subsequent image exceeds a threshold; and
when the remaining time period exceeds the threshold, selecting an ROI having the previously recognized item identifier in the repository, and executing the recognition mechanism.

12. The method of claim 11, further comprising:
in response to executing the recognition mechanism for the selected ROI, comparing a first confidence level associated with the derived item identifier for the selected ROI to a second confidence level associated with the previously recognized item identifier; and
when the first confidence level exceeds the second confidence level, updating the repository to replace the previously recognized item identifier with the derived item identifier for the selected ROI.

13. A computing device, comprising:
a camera;
a memory; and
a processor configured to:
control the camera to capture an image;
track, in association with the image, a pose of the computing device in a coordinate system;
detect a region of interest (ROI) depicting an item in the image;
determine a location of the ROI in the coordinate system, based on the tracked pose;
obtain an item identifier corresponding to the ROI by (i) when a previously recognized item identifier is not available, executing a recognition mechanism to derive the item identifier from the ROI, and (ii) when a previously recognized item identifier is available, bypassing the recognition mechanism and retrieving the previously recognized item identifier; and
return the obtained item identifier corresponding to the ROI.

14. The computing device of claim 13, further comprising a display;
wherein the processor is further configured to: control the display to present a notification based on the obtained item identifier.

15. The computing device of claim 14, wherein the processor is further configured to:
detect a set of ROIs depicting respective items in the image, and repeat the determination of a location, and the obtaining of an item identifier for each ROI;
maintain a target item identifier; and
select one of the ROIs corresponding to an obtained item identifier matching the target item identifier; and
control the display to present the image and a highlight of the one of the ROIs.

16. The computing device of claim 13, wherein the recognition mechanism includes at least one of a barcode decoding mechanism, an optical character recognition (OCR) mechanism, and an object classification mechanism.

17. The computing device of claim 13, wherein the processor is further configured to:
determine whether a previously recognized item identifier is available by accessing a repository of previously recognized item identifiers.

18. The computing device of claim 17, wherein the processor is further configured to:
in response to execution of the recognition mechanism derive the item identifier, update the repository to store the derived item identifier as a previously recognized item identifier.

19. The computing device of claim 18, wherein the processor is further configured to:
prior to updating the repository, determine that a confidence level associated with the derived item identifier meets a threshold.

20. The computing device of claim 19, wherein the confidence level includes at least one of (i) a localization confidence level associated with the pose of the computing device, and (ii) a recognition confidence level associated with the recognition mechanism.

21. The computing device of claim 17, wherein the processor is further configured to:
determine whether a time period remaining before the capture of a subsequent image exceeds a threshold; and
when the remaining time period exceeds the threshold, select an ROI having the previously recognized item identifier in the repository, and execute the recognition mechanism.

22. The computing device of claim 21, wherein the processor is further configured to:
in response to executing the recognition mechanism for the selected ROI, compare a first confidence level associated with the derived item identifier for the selected ROI to a second confidence level associated with the previously recognized item identifier; and
when the first confidence level exceeds the second confidence level, update the repository to replace the previously recognized item identifier with the derived item identifier for the selected ROI.

23. A non-transitory computer-readable medium storing computer-readable instructions executable by a processor of a mobile computing device to:
- control a camera to capture an image;
- track, in association with the image, a pose of the mobile computing device in a coordinate system;
- detect a region of interest (ROI) depicting an item in the image:
- determine a location of the ROI in the coordinate system, based on the tracked pose;
- obtain an item identifier corresponding to the ROI by (i) when a previously recognized item identifier is not available, executing a recognition mechanism to derive the item identifier from the ROI, and (ii) when a previously recognized item identifier is available, bypassing the recognition mechanism and retrieving the previously recognized item identifier; and
- return the obtained item identifier corresponding to the ROI.

\* \* \* \* \*